Patented June 3, 1952

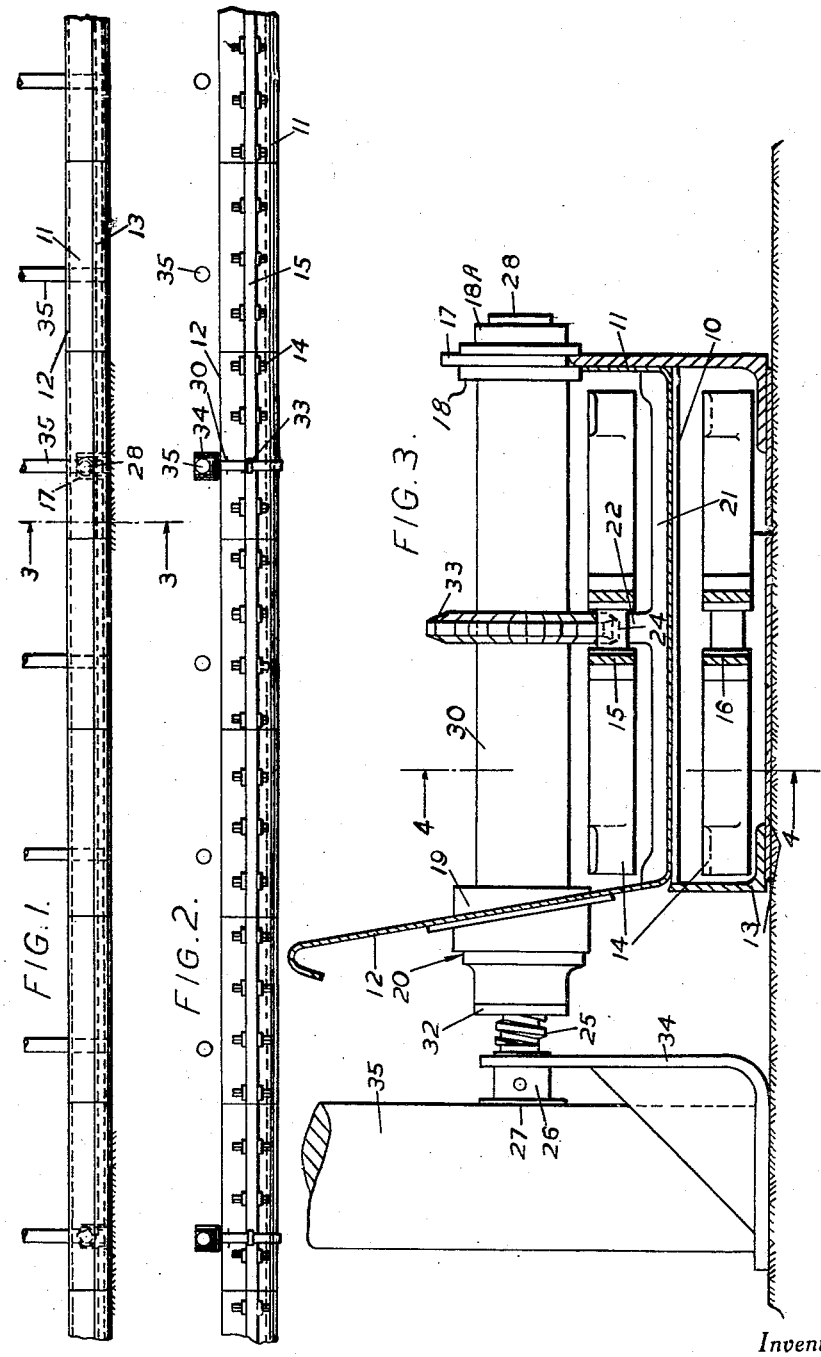

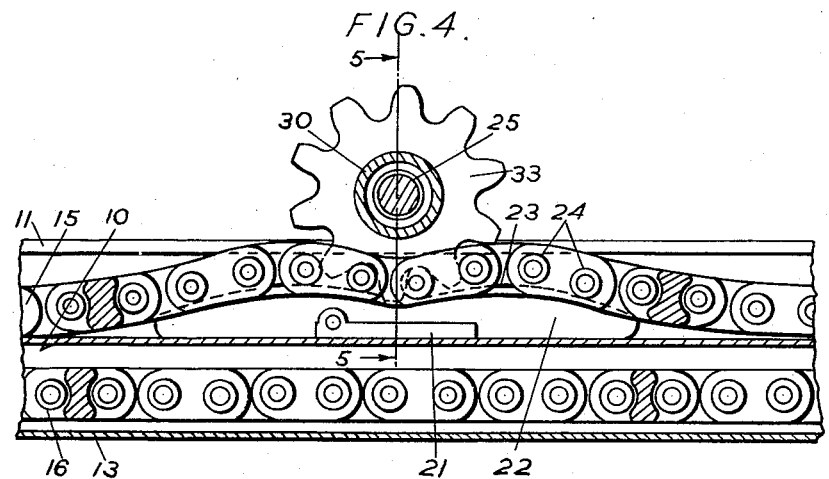
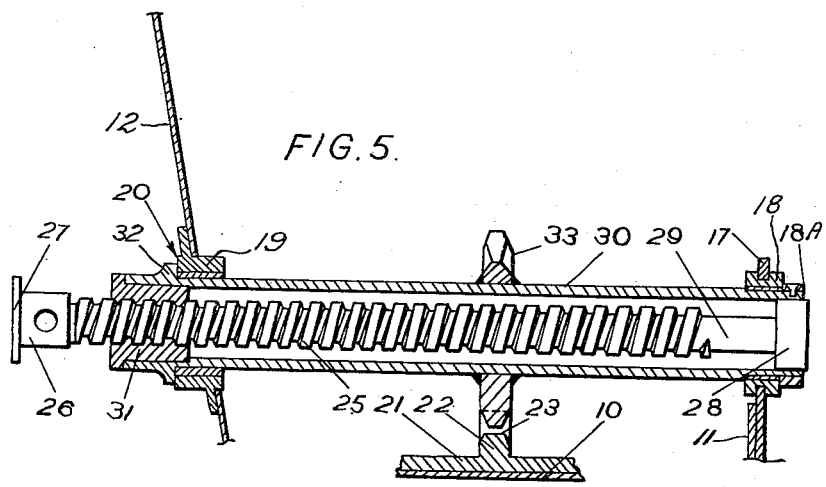

2,598,815

UNITED STATES PATENT OFFICE 2,598,815

CONVEYER AND JACK FOR SHIFTING THE SAME

Thomas McCulloch, Glasgow, Scotland, assignor to Mavor & Coulson, Limited, Glasgow, Scotland Application December 29, 1950, Serial No. 203,347 In Great Britain January 7, 1949

7 Claims. (Cl. 198—126)

In mining coal and other minerals by the so-called "long wall" method, it is customary to extend a conveyor alongside the long wall constituted by the face of the seam of coal or other mineral to be mined. As the face recedes due to the mining operations on the seam, it is necessary periodically to move over the conveyor by shifting it sidewise.

The object of the present invention is to provide jacks by which shifting of the conveyor can be effected and which are operable by the power of the conveyor and moreover to modify the construction of the conveyor for application of the jacks to it.

The invention resides in the combination with a conveyor, comprising a travelling component and a frame, of a jack comprising a rotatable member journalled crosswise in the frame, an axially displaceable member that is applicable to an abutment and is in screw relationship with the rotatable member but can be held against rotation therewith and a driving connection between the rotatable member and the travelling component by virtue of which connection the rotatable member can be rotated and the jack extended by the screw action so that said members thrust the frame from the abutment.

Preferably said rotatable member is a sleeve inside which the axially displaceable member extends and which has a sprocket engageable by the travelling component.

The invention is illustrated by the accompanying drawings, in which:

Fig. 1 is an elevation and Fig. 2 is a plan of a portion of a conveyor of the so-called "scraper" type to which an example of the invention is applied.

Fig. 3 is a section on the line 3—3 of Fig. 1, being drawn to a larger scale; Fig. 4 is a section on the line 4—4 of Fig. 3; and Fig. 5 is a section on the line 5—5 of Fig. 4.

The scraper type conveyor shown has a frame including an open-top troughlike upper channel with a floor 10, a low side wall 11 that comes close to the face of the mineral seam in mining operations and a high opposite side wall 12 that functions to retain the mineral to be conveyed. The frame also includes a lower housing 13 closed on top, at the bottom and on both sides. The travelling component of the conveyor comprises an endless series of scrapers 14 carried by a single endless chain, the upper and lower stretches of which are indicated by 15 and 16. The chain, as usual, passes around sprocket wheels at opposite ends of the frame, these wheels not being shown. The upper stretch 15 of the chain and its scrapers work along the channel 10, 11, 12, and the lower stretch 16 returns through the housing 13.

The conveyor, in comparison with usual conveyors of this type, is modified in the following respects so that a number of screw jacks can be applied to it according to the present invention. At that side of the frame which in use comes adjacent to the face, namely where the low wall 11 is located, there are provided at spaced intervals a number of upward extensions 17 with holes in each of which is inserted a ring 18 forming a bearing. The high wall 12 of the channel is provided with a number of holes in each of which there is fitted a ring 19 formed both as a bearing and with a flat outer face 20 presenting a thrust bearing. All of these rings 18, 19 may be fitted to the channel walls as permanent fixtures or may be removable so that they offer no obstruction to the material during conveying.

The conveyor also is provided with certain detachable fittings, namely a number of shoes 21 each of which when in use is seated on the floor 10 of the channel and extends between, being secured to the walls of the channel. Each shoe has a cam 22 formed with a surface 23 adapted to be engaged by the rollers 24 of the conveyor chain, the form being such that (as Fig. 4 shows) the cam raises the travelling chain from the channel floor, guides the chain to follow a short curved path and finally guides the chain back to the channel floor.

One complete set of bearings 18, 19 and a shoe 21 is provided for the accommodation of each of the jacks, the bearings of each set being arranged opposite one another in axial alignment and the shoe being directly below the common axis of the bearings.

Each screw jack includes a screw 25 (Fig. 5), at the operating outer end of which there is a square head 26 with an abutment flange 27. At the opposite inner end of the screw there is an enlarged journal 28, and between this journal and the end of the screw-threading there is a portion of reduced diameter 29 which constitutes an inoperative portion of the screw. The jack also includes a rotatable sleeve 30 into which the screw extends and which is axially slidable and rotatable on the screw. At the operative end of the jack, there is inserted into the sleeve a nut 31 which mates with the screw and which forms with the sleeve 30 a rotatable unit. Near the same end, the sleeve has a thrust collar 32. The sleeve about midway of its length, has a sprocket 33 adapted to mesh with the rollers 24 of the conveyor chain.

There is also provided for use in association with the jack a bracket 34 (Fig. 3) which forms a footstep for one of a series of roof-supporting props 35 to serve as an abutment against the jack action. This bracket has a formation adapted to engage the square head 26 of the screw 25 to hold it against rotation.

In order to shift the conveyor sidewise, several jacks are fitted in position across the conveyor frame. Each sleeve 30 is inserted through bearings 18, 19 in both walls, the thrust collar 32 coming against the thrust face 20 and an end locking ring 18A being attached to the sleeve. The square head 26 of the screw is inserted in the abutment bracket 34, and the abutment flange 27 of the head is placed against the prop 35. Below each jack, a shoe 21 is fitted in such a way that its cam 22 brings the conveyor chain 15 into mesh with the sprocket 33 on the sleeve. Then the conveyor is started. The effect of this is to drive all the jack sprockets, so that the jacks are operated. Thus, the jacks extend and thrust the conveyor sidewise from the abutment props 35. When the jacks are fully extended, the nut rotates idly in the inoperative portions 29 of the jack screws. Finally, the conveyor is stopped and the detachable fittings are removed.

It will be manifest that the invention provides an improved method of shifting a conveyor, which method consists in fitting a number of screw jacks between abutments and the conveyor frame and connecting the rotatable screw members of the jacks in driving relationship with the travelling component of the conveyor in order to operate the jacks.

As Fig. 5 shows, when the screw 25 occupies its innermost position, the sleeve 30 is closed at one end by the nut 31 and at the other end by the end journal 28, the sleeve-and-nut unit forming a housing for the screw substantially within the widthwise limits of the conveyor frame 10—12.

I claim:

1. The combination of a conveyor and a screw jack for shifting it sidewise by pushing against a fixed abutment, said conveyor comprising a frame with opposite side walls, a longitudinally travelling component movable between said side walls, co-axial bearings in both side walls and a thrust bearing on one of said walls, and said screw jack comprising a long sleeve, which extends across said frame, being journalled in said co-axial bearings, a nut which is provided on said sleeve so as to form therewith a rotatable unit, a thrust collar provided on said unit, said collar being arranged against said thrust bearing, a gear wheel which is provided between said walls on said unit and is engaged with and rotated by said travelling component, and a long screw which is screwed through said nut and extends therefrom inwards into the interior of the sleeve and outwards for engagement with said fixed abutment, said screw having means of engagement by which the abutment holds it against both axial and rotational movement.

2. The combination according to claim 1 in which the long screw at its inner end has a journal on which the sleeve is axially slidable and rotatable.

3. The combination according to claim 2 in which, when the screw occupies its innermost position, the sleeve is closed at one end by the nut and at the other end by the inner-end journal on the screw, the sleeve-and-nut unit forming a housing for the screw substantially within the widthwise limits of the conveyor frame.

4. The combination according to claim 1 in which the travelling component incorporates an endless roller chain and in which the jack-operating gear wheel is a sprocket meshing with said chain.

5. The combination according to claim 4 including also a shoe applicable to the frame and provided with a cam which engages the rollers of the conveyor chain and trains them around the jack-operating sprocket.

6. The combination of a scraper conveyor and a screw jack for shifting it sidewise by pushing against a fixed abutment, said conveyor comprising a frame with side walls and upper and lower sections, a travelling component consisting of transverse flights and an endless power-driven roller chain interconnecting them, said component working along the upper section and returning along the lower section, a pair of co-axial bearings in said side walls, respectively and a thrust bearing on one of said walls, and said screw jack comprising a long sleeve extending across the upper section of said frame and being journalled near its opposite ends in said co-axial bearings, a nut on said sleeve, a sprocket on said sleeve, said sleeve, nut and sprocket forming a rotatable unit, a thrust face provided on said unit to contact said thrust bearing, means in the upper section of said frame training said roller chain to mesh with said sprocket, and a long screw which is screwed through said nut and extends therefrom inwards into the interior of the sleeve and outwards for engagement with said fixed abutment, said screw having means of engagement by which the abutment holds it against both axial and rotational movement.

7. The combination according to claim 6 in which the long screw has at its inner end an enlarged journal made to fit in said sleeve slidably and turnably, so that said journal serves as a closure to one end of the interior of the sleeve, and in which said nut serves as a closure to the other end of said sleeve.

THOMAS McCULLOCH.

REFERENCES CITED

The following references are of record in the file of this patent:

UNITED STATES PATENTS

| Number | Name | Date |
| --- | --- | --- |
| 1,561,481 | O'Toole | Nov. 17, 1925 |
| 1,638,507 | O'Toole | Aug. 9, 1927 |
| 1,773,414 | Warden | Aug. 19, 1930 |
| 2,065,819 | McCarthy | Dec. 29, 1936 |
| 2,399,713 | Tibbals | May 7, 1946 |